United States Patent
Ruan et al.

(10) Patent No.: US 8,100,536 B2
(45) Date of Patent: Jan. 24, 2012

(54) DIGITAL LIGHT PROCESSING PROJECTOR

(75) Inventors: Zhuo-Guang Ruan, Guangdong (CN); Ming-Hsun Hsieh, Tu-Cheng (TW)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 520 days.

(21) Appl. No.: 12/353,202

(22) Filed: Jan. 13, 2009

(65) Prior Publication Data
US 2010/0053563 A1   Mar. 4, 2010

(30) Foreign Application Priority Data
Aug. 26, 2008   (CN) .......................... 2008 1 0304200

(51) Int. Cl.
*G03B 21/26* (2006.01)
(52) U.S. Cl. ......................................... 353/34; 348/742
(58) Field of Classification Search .................... 353/34, 353/33, 81, 97; 348/771, 742, 743; 359/833, 359/834
See application file for complete search history.

(56) References Cited

U.S. PATENT DOCUMENTS
6,886,947 B2 * 5/2005 Konishi ..................... 353/119
2003/0147158 A1 * 8/2003 Penn ............................ 359/833
* cited by examiner

*Primary Examiner* — Que T Le
*Assistant Examiner* — Jerry Brooks
(74) *Attorney, Agent, or Firm* — Altis Law Group, Inc.

(57) ABSTRACT

A DLP projector includes a light source generating white light beams, a color wheel separating the white light beams into three colored light beams, an integration rod rendering the colored light beams uniform, a projection lens, a DMD, a light-shade and a light-absorbing member. When a light beam on a first path is in use, a micro mirror of the DMD reflects the light beam on the first path to follow a second path towards the projection lens. Otherwise, the micro mirror reflects the light beam on the first path to follow a third, fourth and fifth path out of the projection lens. The light-shade is positioned in a light path of the light beam out of the projection lens. The light-absorbing member is under the light-shade and absorbs the light beam on the fifth path, the light beam on a sixth and a seventh path reflected by the light-shade.

8 Claims, 6 Drawing Sheets

DIGITAL LIGHT PROCESSING PROJECTOR

BACKGROUND

1. Technical Field

The present disclosure relates to projecting technology and, particularly, to a Digital Light Processing projector.

2. Description of the Related Art

Digital micro mirror devices (DMDs) are commonly used for modulating light from a light source into a visual image according to input image signals in a Digital Light Processing (DLP) projector, and in cooperation with a projection lens to project the visual image onto a screen. DMDs are semiconductor devices controlled by controlling signals, such as binary pulses and typically include arrays of rotatable micro mirrors. These rotatable micro mirrors are selected to reflect light beams from the light source towards the projection lens to constitute the visual image according to the controlling signals.

Referring to FIG. 6, specifically, when a light beam on path $L_1$ from the light source is used for helping to constitute the visual image, the micro mirror 200 is rotated clockwise by 10 degrees from an initial position $P_1$ towards an on position $P_2$. Thereby reflecting the light beam on path $L_2$. The light beam on path $L_2$ is directed to the projection lens by the micro mirror 200. Otherwise, the micro mirror 200 is rotated counterclockwise by 10 degrees from the initial position $P_1$ towards an off position $P_3$ and the light beam on path $L_1$ is then reflected as light beam on path $L_3$ and directed out of the projection lens by the micro mirror 200.

However, the light beam on path $L_3$ may be reflected by other components inside the DLP projector and gets into the paths of light beams from other micro mirrors, thus interfering with the constitution of a desired image.

Therefore, what is needed is to provide a DLP projector which can overcome the above-mentioned problem.

DETAILED DESCRIPTION

Figure 1:
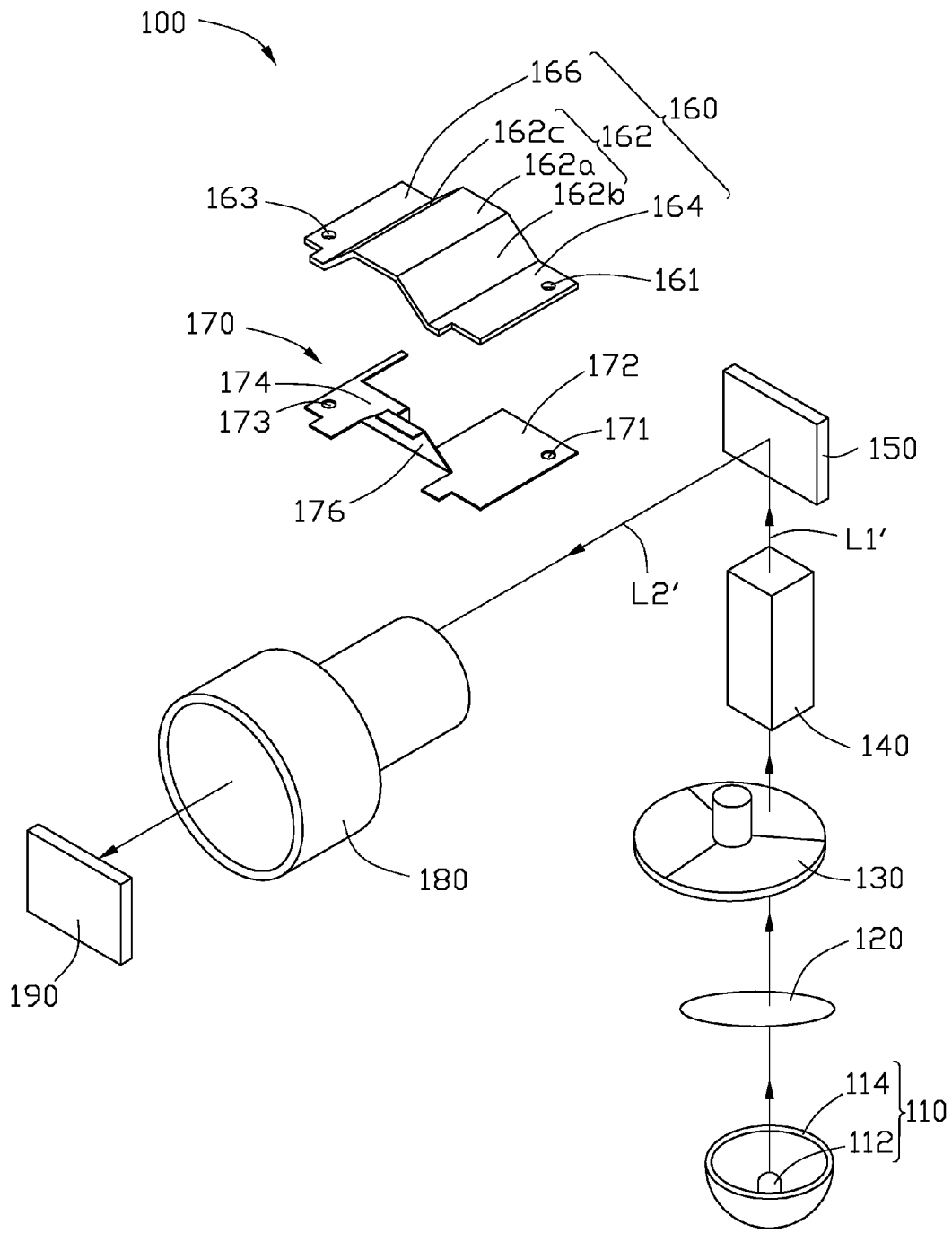
FIG. 1 is an exploded, isometric view of a DLP projector according to an exemplary embodiment, showing a light beam being reflected by a DMD towards a projection lens.

Referring to FIG. 1, a digital light processing (DLP) projector 100, according to an exemplary embodiment, includes a light source 110, a condensing lens 120, a color wheel 130, an integration rod 140, a DMD 150, a light-shade 160, a light-absorbing member 170 and a projection lens 180.

The light source 110 includes a lamp 112 and a lamp reflector 114. The lamp 112, such as a high pressure mercury lamp, a metal halide lamp, a xenon lamp, or a light emitting diode (LED) lamp, is configured for generating white light beams. The lamp reflector 114 reflects the white light beams generated by the lamp 112 to the condensing lens 120. In this embodiment, the lamp reflector 114 is elliptical, and the lamp 112 is positioned at a focal point of the lamp reflector 114.

The condensing lens 120 is positioned between the light source 110 and the color wheel 130. The condensing lens 120 is configured for condensing the light beams from the light source 110.

The color wheel 130 is positioned in a light path of the light beams from the condensing lens 120 for receiving the condensed light beams and is configured for separating the condensed white light beams impinging thereon into three colored incident light beams, such as red (R), green (G), and blue (B) lights.

The integration rod 140 is positioned between the color wheel 130 and the DMD 150. The integration rod 140 is configured for receiving the colored light beams from the color wheel 130 and configured for rendering the light beams uniform in intensity.

Figure 3:
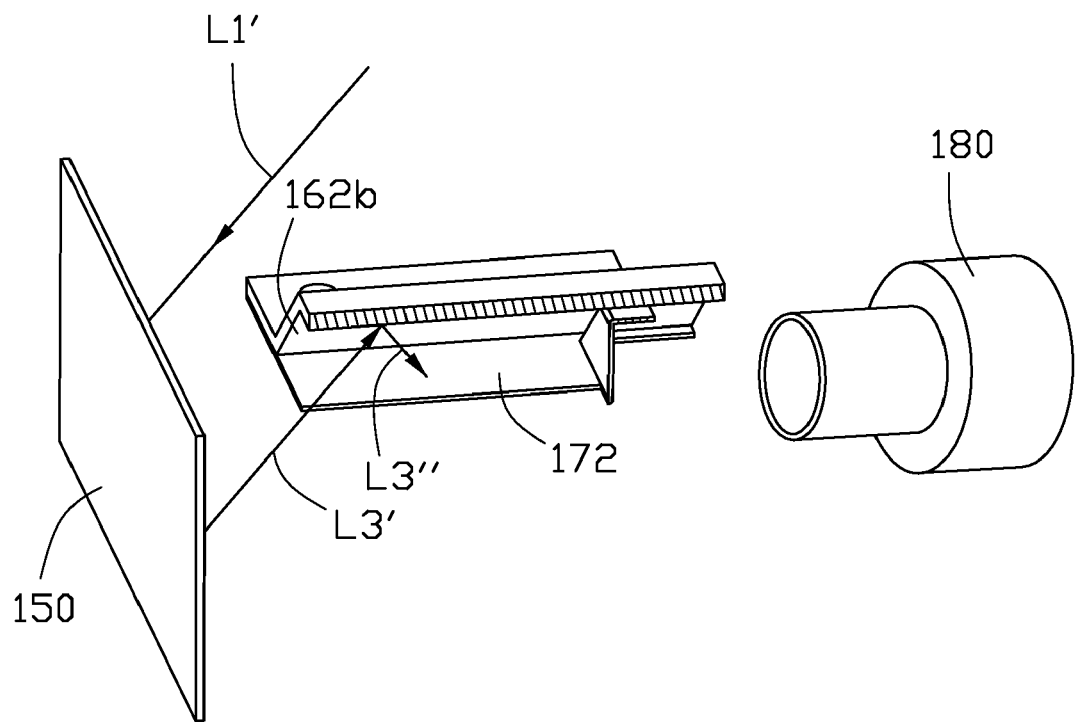
FIG. 3 is a partial cross-sectional view of the DLP projector of FIG. 1, showing a light beam being reflected along a first direction by the DMD away from the projection lens.
Figure 4:
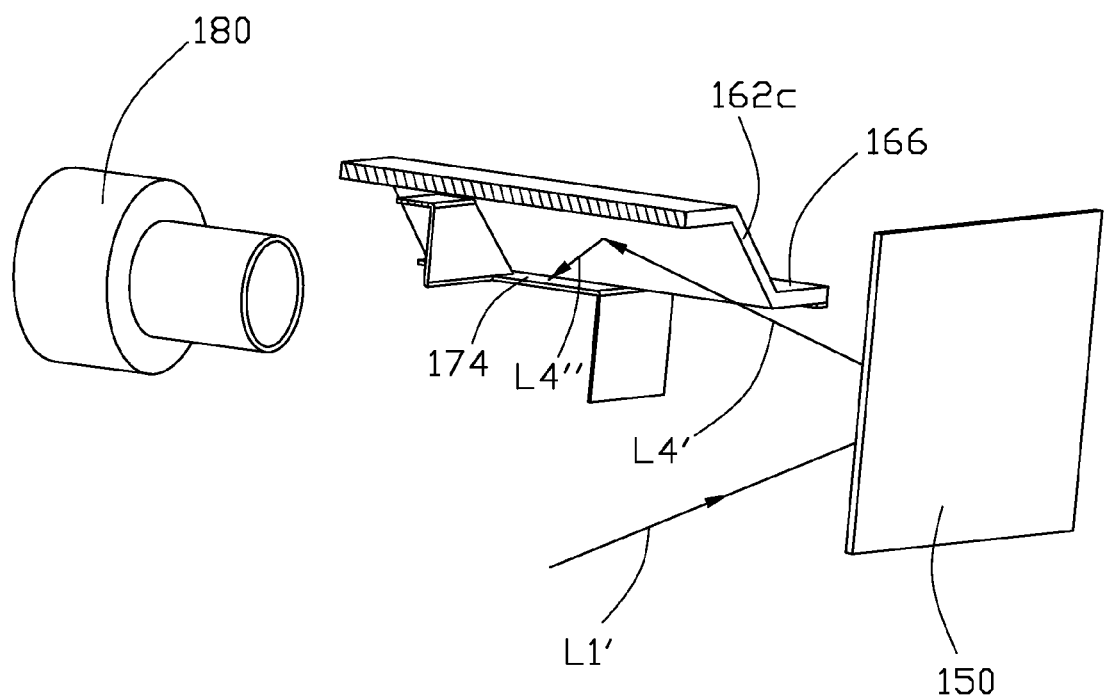
FIG. 4 is similar to FIG. 3, but viewing the DLP projector from another angle and showing a light beam being reflected along a second direction by the DMD away from the projection lens.
Figure 5:
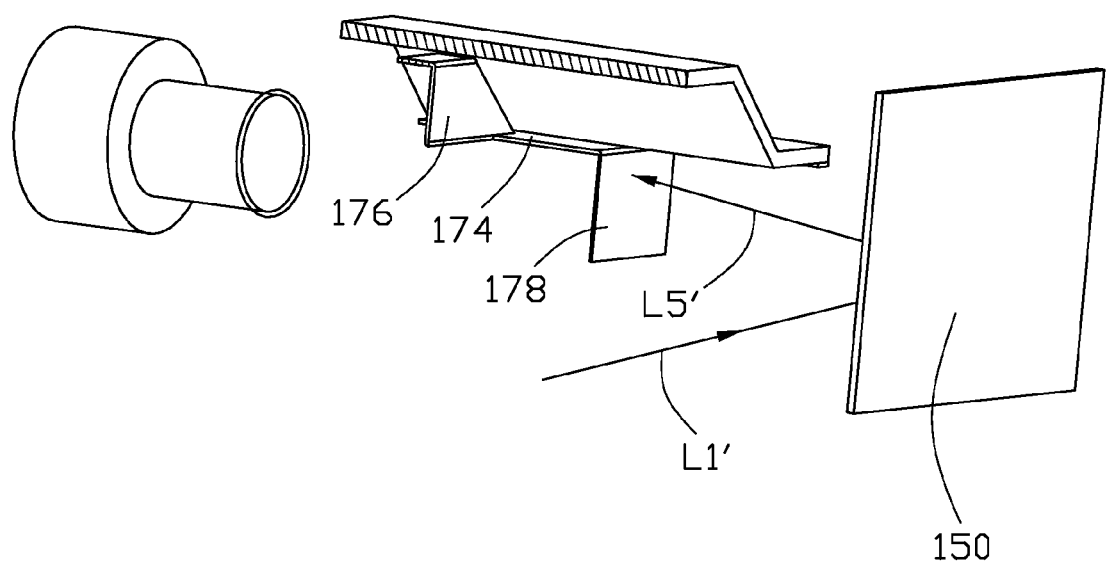
FIG. 5 is similar to FIG. 4, and showing a light beam being reflected along a third direction by the DMD away from the DLP projection lens.
Figure 6:
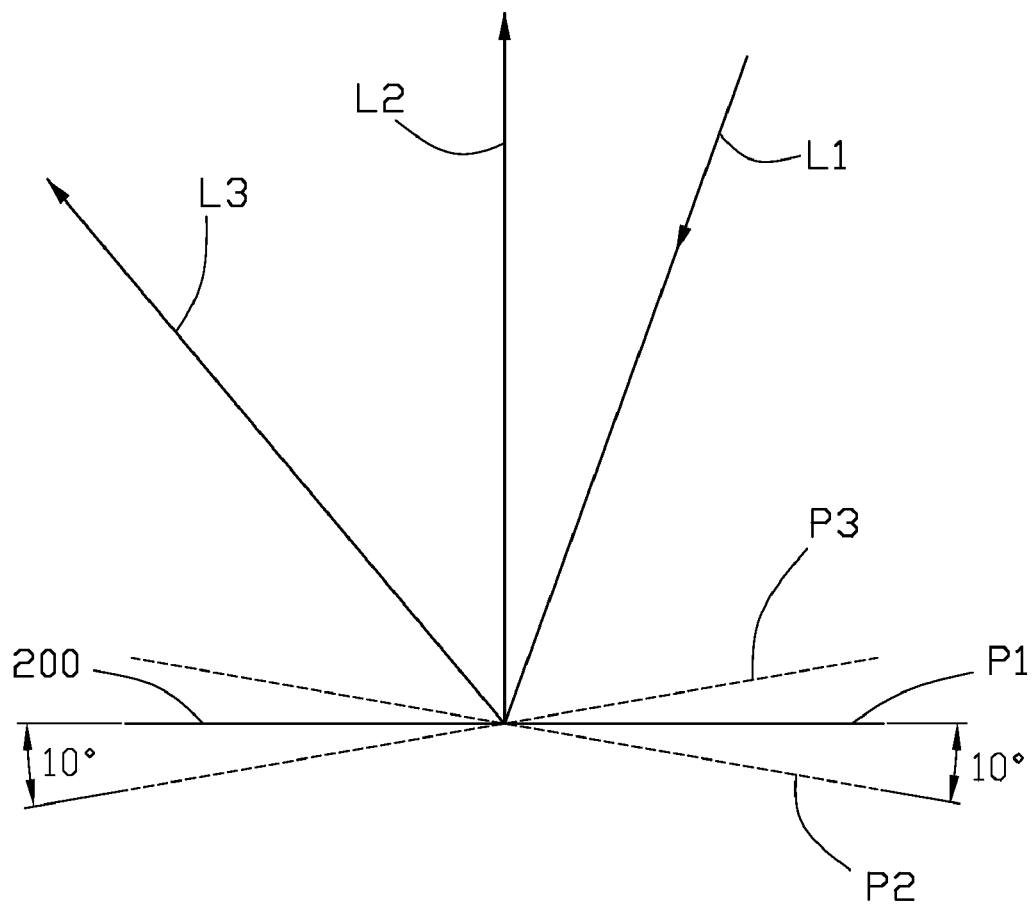
FIG. 6 is a schematic view of a working process of a micro mirror in a DLP projector.

The DMD 150 is configured for modulating the colored light beams from the integration rod 140 into visual images according to input video signals. During modulation, each micro mirror of the DMD 150 is rotated according to controlling signals, such as a series of binary pulses generated by addressing electrodes and landing electrodes in the DLP projector, to determine whether a light beam on a first path $L_1'$ is reflected towards the projection lens 180. Referring to FIG. 1, when the light beam on the first path $L_1'$ is used for helping to constitute the visual image in cooperation with other light beams, one of the micro mirrors of the DMD 150 impinged on by the light beam on the first path $L_1'$ is selected to reflect the light beam on the first path $L_1'$ to follow a second path $L_2'$ towards the projection lens 180. The projection lens 180 projects the light beam on the second path $L_2'$ onto a screen 190 to form the visual image. Referring to FIGS. 3-5, when the light beam on the first path $L_1'$ is not used for the visual image, the micro mirror of the DMD 150 is controlled to reflect the light beam on the first path $L_1'$ to follow a third path $L_3'$, a fourth path $L_4'$, and a fifth path $L_5'$ away from the projection lens 180.

The light-shade 160 is positioned in a light path of the light beam reflected away from the projection lens 180, such as the light beam on the third, the fourth and the fifth path $L_3'$, $L_4'$, $L_5'$ between the DMD 150 and the projection lens 180, and is configured for keeping the light beam out of the projection lens 180 and other optical elements (not shown) in the DLP projector 100. The light-shade 160 includes a approximately bow-shaped body 162, a first platform 164, and a second platform 166. The body 162 includes a plane surface 162a and two inclined surfaces 162b, 162c extending from two opposite ends of the plane surface 162a respectively. The first and second platforms 164, 166 extend from distal ends of the two inclined surfaces 162b, 162c with a direction parallel to the plane surface 162a. A first through hole 161 is defined on the first platform 164. A second through hole 163 is defined on the second platform 166.

Figure 2:
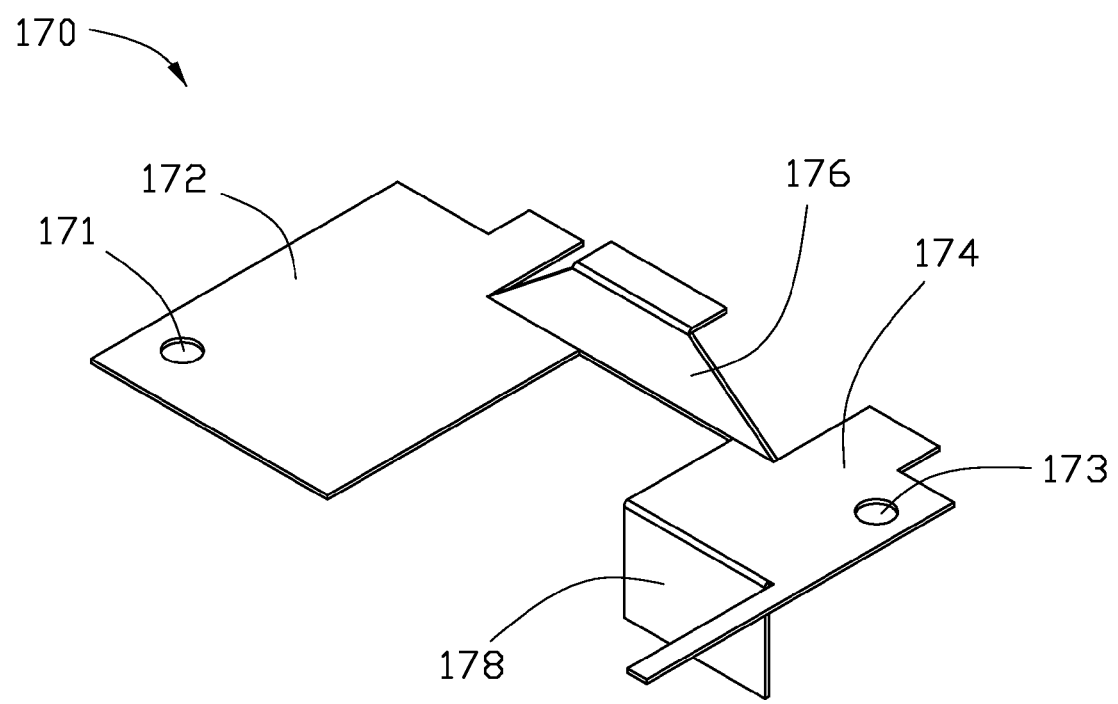
FIG. 2 is an enlarged, isometric view of a light-absorbing member of the DLP projector of FIG. 1.

Referring to FIGS. 1-2, the light-absorbing member 170 is painted black or coated with a light-absorbing film. The light-absorbing member 170 is positioned under the light-shade 160 and between the projection lens 180 and the DMD 150. The light-absorbing member 170 includes a first plate 172, a second plate 174, a connecting plate 176 perpendicularly connecting the first plate 172 to the second plate 174 parallel to each other, and a third plate 178. The connecting plate 176 is shaped and sized to fit the body 162 of the light-shade 160 so that the light-shade 160 covers the light-absorbing member 170.

Referring to FIGS. 1-3, an area of an orthogonal projection of the inclined surface 162b and the first platform 164 on the first plate 172 is no greater than that of the first plate 172 so that the first plate 172 is capable of absorbing the light beam on a sixth path $L_3''$ reflected by the inclined surface 162b from the light beam on the third path $L_3'$. A third through hole 171 is defined on the first plate 172 corresponding to the first through hole 161.

Referring to FIGS. 1-2 and 4, an area of an orthogonal projection of the inclined surface 162c and the second platform 166 on the second plate 174 is no greater than that of the second plate 174 so that the second plate 174 is capable of absorbing the light beam on a seventh path $L_4''$ reflected by the inclined surface 162c from the light beam on the fourth path $L_4'$. A fourth through hole 173 is defined on the second plate 174 corresponding to the second through hole 163.

Referring to FIGS. 1-2 and 5, the third plate 178 perpendicularly extends from the second plate 174 away from the connecting plate 176. The third plate 178 is capable of absorbing the light beam on the fifth path $L_5'$ reflected by the micro mirror of the DMD 150 from the light beam on the first path $L_1'$. The DLP projector 100 further includes an optical engine (not shown). A first bolt (not shown) runs through the first through hole 161 and the third through hole 171 to engage with the optical engine of the DLP projector 100. A second bolt (not shown) runs through the second through hole 163 and the fourth through hole 173 to engage with the optical engine of the DLP projector 100. As a result, the light-shade 160 and the light-absorbing member 170 are fixed to the optical engine. The projection lens 180 faces the DMD 150 to let the light beam on the second path $L_2'$ in.

Referring to FIGS. 3-5, when the light beam on the first path $L_1'$ is not used for the visual image, one of the micro mirrors of the DMD 150 impinged on by the light beam on the first path $L_1'$ is selected to reflect the light beam on the first path $L_1'$ to follow the third path $L_3'$, the fourth path $L_4'$, and the fifth path $L_5'$, in order to reflect them away from the projection lens 180. The first plate 172 is capable of absorbing the light beam on the sixth path $L_3''$ reflected by the inclined surface 162b from the light beam on the third path $L_3'$. The second plate 174 is capable of absorbing the light beam on the seventh path $L_4''$ reflected by the inclined surface 162c from the light beam on the fourth path $L_4'$. The third plate 178 is capable of absorbing the light beam on the fifth path $L_5'$ reflected by one of the micro mirrors of the DMD 150 from the incident light beam $L_1'$. As a result, the unused light beam can be absorbed, thereby enhancing quality of the visual image.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A digital light processing projector comprising:
a light source configured for generating white light beams;
a color wheel configured for separating the white light beams into three colored light beams;
an integration rod configured for rendering the colored light beams uniform in intensity;
a projection lens;
a digital micro mirror device configured for modulating the light beams from the integration rod into visual images, wherein when a light beam on a first path is used for helping to constitute a visual image, one of micro mirrors of the digital micro mirror device reflects the light beam on the first path to follow a second path towards the projection lens; and when the light beam on a first path is not used for helping to constitute a visual image, the micro mirror reflects the light beam on the first path to follow a third, a fourth and a fifth path away from the projection lens;
a light-shade positioned in a light path of the light beam on the third, the fourth and the fifth path between the digital micro mirror device and the projection lens, and configured for blocking the light beam on the third, the fourth and the fifth path, the light-shade comprising an approximately bow-shaped body, a first platform, and a second platform, the body comprising a plane surface and two inclined surfaces respectively extending from two opposite ends of the plane surface, respectively, and the first and second platforms extending from distal ends of the two inclined surfaces with a direction parallel to the plane surface; and
a light-absorbing member positioned under the light-shade and between the projection lens and the digital micro mirror device, and configured for absorbing the light beam on the fifth path, and the light beam on a sixth path and a seventh path reflected by the light-shade from the light beam on the third path and the fourth path, respectively.

2. The digital light processing projector as claimed in claim 1, wherein the light-absorbing member is coated with a light-absorbing film.

3. The digital light processing projector as claimed in claim 1, wherein the light-absorbing member is painted black.

4. The digital light processing projector as claimed in claim 1, wherein the light-absorbing member comprises a first plate, a second plate parallel to the first plate, a connecting plate connecting the first plate to the second plate, and a third plate, the connecting plate is shaped and sized to fit the body of the light-shade so that the light-shade covers the light-absorbing member, and the third plate is capable of absorbing the light beam on the fifth path reflected by the micro mirror from the light beam on the first path.

5. The digital light processing projector as claimed in claim 4, wherein the third plate is perpendicular to the second plate.

6. The digital light processing projector as claimed in claim 4, wherein the connecting plate is perpendicular to the first plate and the second plate.

7. The digital light processing projector as claimed in claim 4, wherein an area of an orthogonal projection of one of the inclined surfaces and the first platform is smaller than that of the first plate so that the first plate is capable of absorbing the light beam on the sixth path reflected by the inclined surface from the light beam on the third path.

8. The digital light processing projector as claimed in claim 4, wherein an area of an orthogonal projection of one of the inclined surfaces and the second platform is smaller than that of the second plate so that the second plate is capable of absorbing the light beam on the seventh path reflected by the inclined surface from the light beam on the fourth path.

* * * * *